(12) United States Patent
Aljecera et al.

(10) Patent No.: US 10,742,826 B2
(45) Date of Patent: Aug. 11, 2020

(54) MEDIA SENSING ASSEMBLY IN A MANUAL INPUT FEEDER OF AN IMAGE FORMING DEVICE

(71) Applicant: Lexmark International, Inc., Lexington, KY (US)

(72) Inventors: Hannibal Bartolata Aljecera, Cebu (PH); Romeo P. Lonoy, Mandaue (PH); Lowell Libo-on Tacadoa, Mandaue (PH)

(73) Assignee: LEXMARK INTERNATIONAL, INC., Lexington, KY (US)

( * ) Notice: Subject to any disclaimer, the term of this patent is extended or adjusted under 35 U.S.C. 154(b) by 0 days.

(21) Appl. No.: 16/174,813

(22) Filed: Oct. 30, 2018

(65) Prior Publication Data

US 2020/0137247 A1   Apr. 30, 2020

(51) Int. Cl.
*H04N 1/00* (2006.01)
*H04N 1/028* (2006.01)
*H04N 1/12* (2006.01)

(52) U.S. Cl.
CPC ..... *H04N 1/00689* (2013.01); *H04N 1/00694* (2013.01); *H04N 1/121* (2013.01)

(58) Field of Classification Search
CPC .......... H04N 1/00689; H04N 1/00694; H04N 1/121; H04N 1/00663; H04N 1/00477; H04N 1/00692
See application file for complete search history.

(56) References Cited

U.S. PATENT DOCUMENTS

| | | | |
|---|---|---|---|
| 9,302,863 B1* | 4/2016 | Piening | B65H 3/0684 |
| 2016/0142572 A1* | 5/2016 | Maeda | H04N 1/00663 358/1.15 |
| 2016/0342124 A1* | 11/2016 | Iwadate | G03G 15/6508 |

* cited by examiner

*Primary Examiner* — Iriana Cruz

(57) ABSTRACT

A media detection assembly for sensing media presence in a manual input feeder having a media support surface that is foldable out of a front of a removable media input tray of an image forming device. The media detection assembly includes a sensor disposed above the media support surface. A rotatable first arm is mounted above the media support surface and movable between a first position when no media is present in the media support surface and a second position when media is present in the media support surface. A rotatable second arm is mounted between the first arm and the sensor and is operatively connected to the first arm such that the second arm is movable by the first arm to change a state of the sensor when the first arm moves between the first position and the second position.

1 Claim, 7 Drawing Sheets

MEDIA SENSING ASSEMBLY IN A MANUAL INPUT FEEDER OF AN IMAGE FORMING DEVICE

CROSS REFERENCES TO RELATED APPLICATIONS

None.

BACKGROUND

1. Field of the Disclosure

The present disclosure relates generally to imaging devices and more particularly to a media sensing assembly for detecting media presence in a manual input feeder of an imaging device.

2. Description of the Related Art

A typical imaging device such as an electrophotographic printer, for example, may include a manual input or multi-purpose feeder (MPF) for handling envelopes, index cards or other media for which only a small number of media will be printed. The MPF has a media tray for supporting media to be fed into the imaging device. The media tray may be equipped with a sensing mechanism to detect the presence or absence of media therein. For instance, a sensor may be used to indicate an empty condition so that informational and operational warnings may be provided. An empty condition signal is useful to alert users to load media and, in some cases, prevent operation of the imaging device to prevent damage or unnecessary wear.

Space limitations may present challenges when integrating sensing components into a manual input feeder. For example, in a flag sensor configuration, sensor integration becomes increasingly difficult as the space available becomes smaller since the flag may require a large space to have enough flag rotation to actuate the sensor. Additionally, the flag must fit within the MPF as closing the MPF tray further narrows the space available for the mechanism. In other MPF designs, a compact flag sensor module is disposed along the MPF tray to detect media therein. Although this type of sensor configuration achieves a relatively small footprint on the MPF tray, design constraints sometimes permit only the use of this sensor configuration when the MPF is integrated in the imaging device since fixed electrical connection between the flag sensor and the imaging device controller may be easily established. When an MPF is integrated in a removable media input tray of the imaging device, additional electrical wirings and/or contacts are required to facilitate connection and disconnection between sensor and imaging device controller when the media input tray is inserted into and removed from the imaging device, respectively.

SUMMARY

Embodiments of the present disclosure provide features for detecting media presence in a manual input feeder. A media detection assembly for sensing media presence in a manual input feeder according to one example embodiment includes a sensor disposed above the media support surface that is foldable out of a front of a removable media input tray of an image forming device. A rotatable first arm is mounted above the media support surface and movable between a first position when no media is present in the media support surface and a second position when media is present in the media support surface. A rotatable second arm is mounted between the first arm and the sensor. The second arm is operatively connected to the first arm such that the second arm is movable by the first arm to change a state of the sensor when the first arm moves between the first position and the second position.

A manual input feeder in a removable media input tray of an image forming device according to another example embodiment includes a media support surface foldable out of a front of the media input tray for holding at least one media sheet. A first arm is pivotably mounted about a first pivot axis above the media support surface and movable between a first position when no media sheet is present in the media support surface and a second position when the at least one media sheet is present in the media support surface. A second arm is pivotably mounted about a second pivot axis above the media support surface. The second arm is operatively connected to the first arm such that the second arm changes a state of a sensor in the image forming device when the first arm moves between the first position and the second position. The first arm and second arm are separated from the sensor when the media input tray is removed from the image forming device, and are in an operative position relative to the sensor when the media input tray is inserted into the image forming device.

A removable media input tray for an image forming device according to another example embodiment includes a manual input feeder having a fold-out tray that is foldable out of a front of the media input tray for holding at least one media sheet. A first arm is pivotably mounted on the manual input feeder and movable between a first position when no media sheet is present in the fold-out tray and a second position when the at least one media sheet is disposed in the fold-out tray. A second arm is pivotably mounted about a second pivot axis above the fold-out tray. The second arm is operatively connected to the first arm such that the second arm changes a state of a sensor in the image forming device when the first arm moves between the first position and the second position. When the media input tray is inserted into the image forming device, the first and second arms are in an operative position relative to the sensor such that movement of the first arm between the first position and the second position moves the second arm to change the state of the sensor. When the media input tray is removed from the image forming device, the first and second arms are separated from the sensor such that movement of the first and second arms does not change the state of the sensor.

BRIEF DESCRIPTION OF THE DRAWINGS

The accompanying drawings incorporated in and forming a part of the specification, illustrate several aspects of the present disclosure, and together with the description serve to explain the principles of the present disclosure.

DETAILED DESCRIPTION

In the following description, reference is made to the accompanying drawings where like numerals represent like elements. The embodiments are described in sufficient detail to enable those skilled in the art to practice the present disclosure. It is to be understood that other embodiments may be utilized and that process, electrical, and mechanical changes, etc., may be made without departing from the scope of the present disclosure. Examples merely typify possible variations. Portions and features of some embodiments may be included in or substituted for those of others. The following description, therefore, is not to be taken in a limiting sense and the scope of the present disclosure is defined only by the appended claims and their equivalents.

Figure 1:
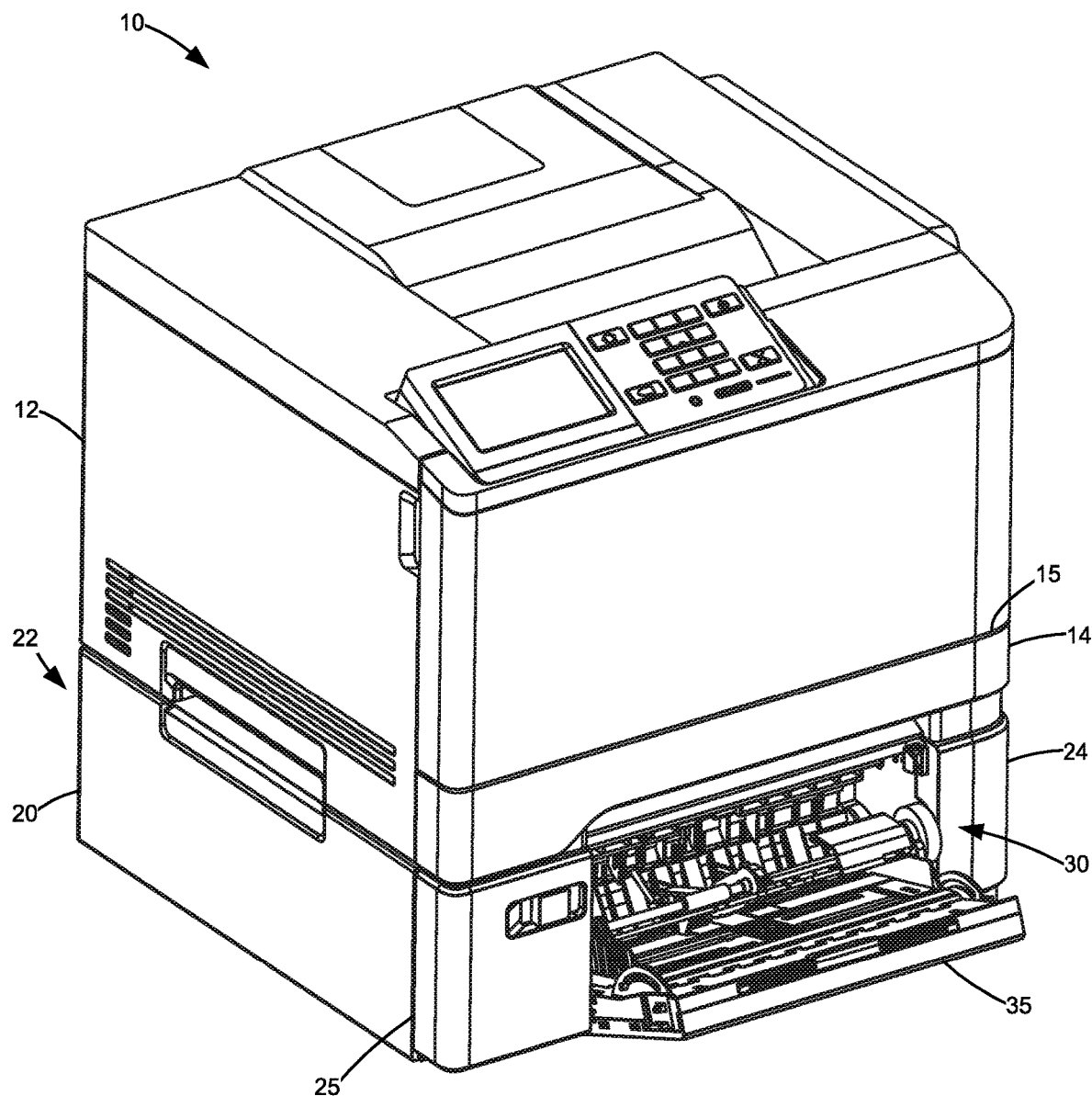
FIG. 1 is a perspective view of an imaging apparatus according to one example embodiment.
Figure 2:
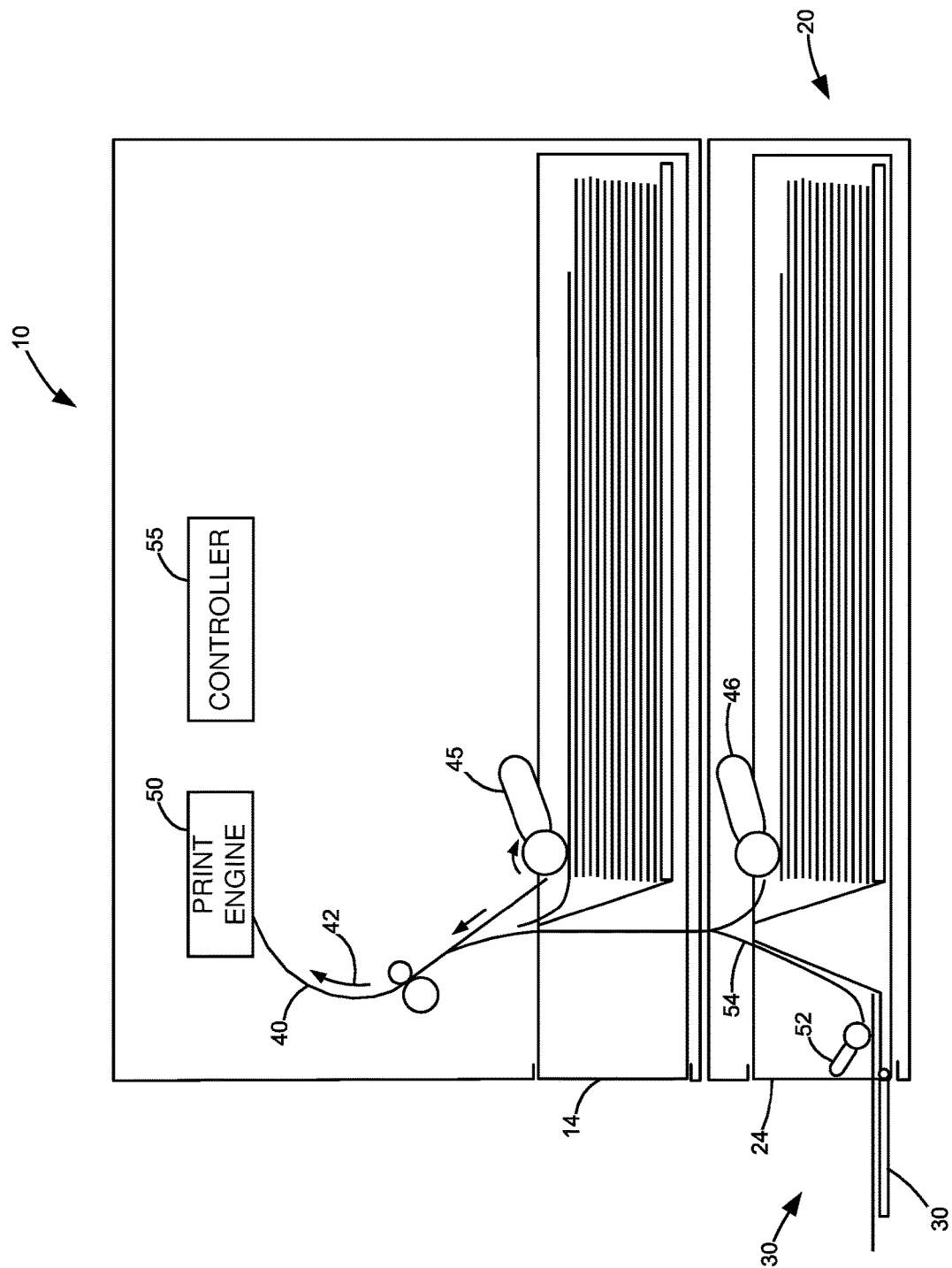
FIG. 2 is a schematic illustration of the imaging apparatus in FIG. 1.

Referring now to the drawings and particularly to FIGS. 1 and 2, there is shown an imaging apparatus 10 according to one example embodiment. Imaging apparatus 10 may be an electrophotographic printer, an inkjet printer, or any imaging device. Imaging apparatus 10, which may be a standalone imaging device, includes a housing 12 having a removable media tray 14 for supporting sheets of media, such as, but not limited to, paper, card stock film, transparencies, or printer labels. Media tray 14 may be inserted into or removed from housing 12 through an opening 15. Additionally, imaging apparatus 10 may include an option assembly 20 removably attachable to a bottom of imaging apparatus 10 to provide an additional input media source. Option assembly 20 includes a housing 22 and removable media input tray 24 that is slidably received into the option housing 22 via an opening 25. In the example shown, media input tray 24 includes a manual input or multi-purpose feeder (MPF) 30 disposed within a front portion of media input tray 24 behind a front panel 35. Front panel 35 is rotated open to provide access to MPF 30. A latch 37 is provided on the front portion of media input tray 24 for securing front panel 35 in a closed position.

FIG. 2 is a schematic illustration of imaging apparatus 10. Imaging apparatus 10 has a media path 40 through which media sheets travel in a media feed direction, as indicated generally by arrow 42. In each of media trays 14, 24, a corresponding pick mechanism 45, 46 picks and feeds media sheets 48 into media path 40. Picked media sheets travel along media path 40 to a location adjacent a print engine 50 for printing images thereon. Additionally, media sheets may be manually loaded by a user via front panel 35 into MPF 30. A pick mechanism 52 in MPF 30 picks and feeds the media sheet along an auxiliary media path 54 and into media path 40. A controller 55, such as an ASIC(s), microprocessor(s), etc., processes print data and controls various hardware of imaging apparatus 10 including pick mechanisms 45, 46, 52 and print engine 55 to coordinate movement of media sheets in imaging apparatus 10 and convert image data to printed data on sheets of media.

Figure 3:
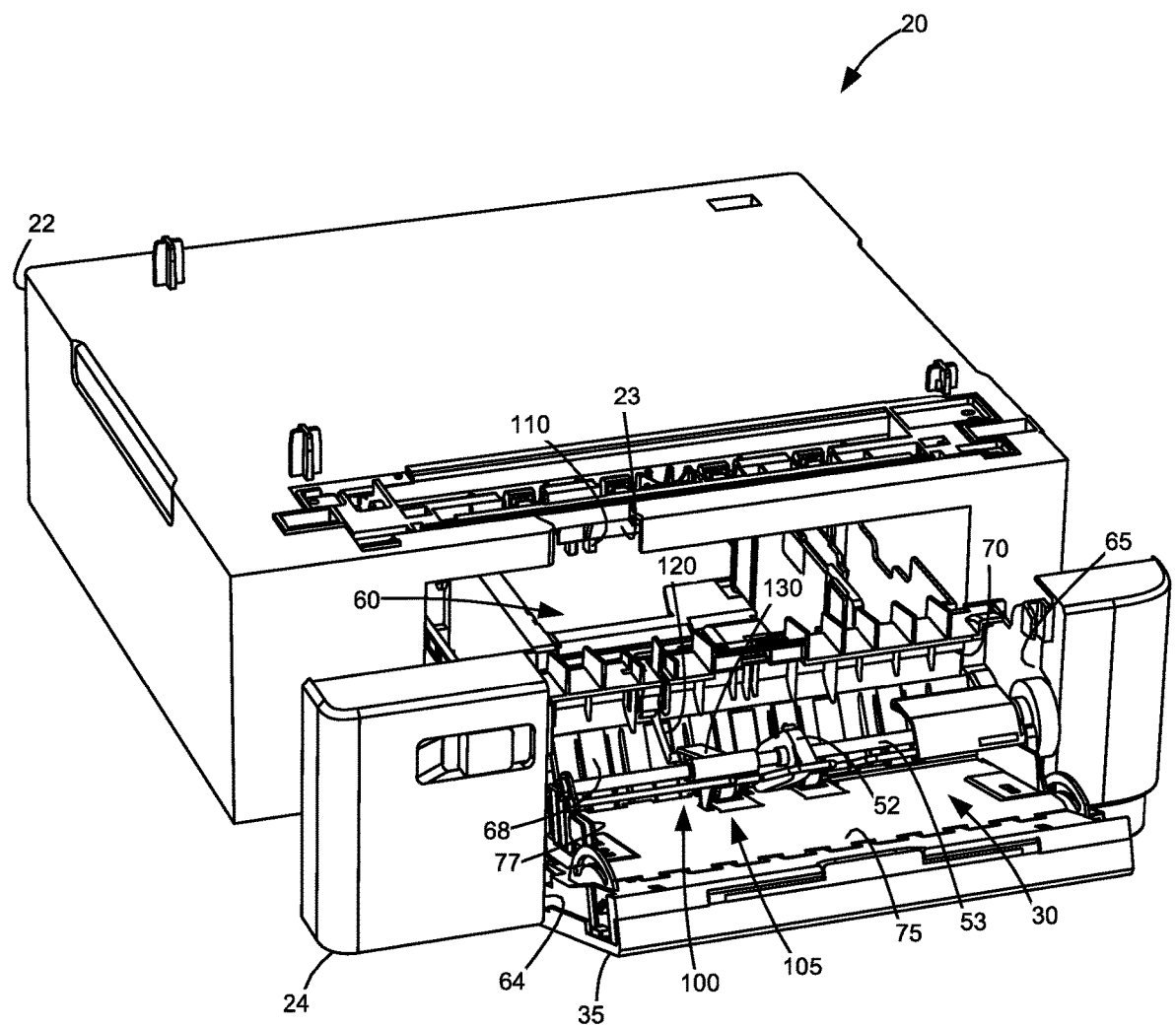
FIG. 3 is perspective view of an option assembly of the imaging apparatus in FIG. 1 with a partially opened media input tray and a manual input feeder integrated therein.

FIG. 3 illustrates a perspective view of option assembly 20 with media input tray 24 partially opened and front panel 35 in the open position providing access to MPF 30 according to one example embodiment. Media input tray 24 has a media storage area 60 for storing media to be fed for printing. At the front portion of media input tray 24, front panel 35 is pivotally attached to left and right wall extensions 64, 65. Intermediate left and right wall extensions 64, 65 is a media dam 68. In front of media dam 68 as viewed in FIG. 2 is a guide member 70 that extends between left and right wall extensions 64, 65. Guide member 70 is generally parallel to but spaced apart from media dam 68 forming a media channel through which media sheets from MPF 30 are fed into auxiliary media path 54. A fold-out tray or media support surface 75 is provided on the inside of front panel 35 for supporting one or more sheets of media. Media support surface 75 may include two or more overlapping members that may be extended outwardly to provide a large support surface area for media sheets. Media sheets are held in place by transversely slidable edge guides 77, 78 that abut left and right edges of media sheets disposed in media support surface 75. Slidable edge guides 77, 78 are mounted on media support surface 75. Front edges of media sheets abut media dam 68 that is transverse to the media feed direction. Media dam 68, which is at an angle with respect to media support surface 75, directs the front edge of the picked media sheet into auxiliary media path 54. Guide member 70 is also spaced above media support surface 75.

MPF 30 includes a sensing assembly 100 for sensing media presence in media support surface 75. In the example embodiment illustrated, media presence sensing assembly 100 includes a flag mechanism 105 in media input tray 24 that is positioned to interface with a sensor 110 fixedly mounted on an upper frame 23 of the option assembly housing 22 when media input tray 24 is inserted into housing 22. In this example, flag mechanism 105 is removable together with media input tray 24 from housing 22 while sensor 110 remains fixed within housing 22. Flag mechanism 105 includes a flag arm 120 and an actuator arm 130 separately pivotably mounted above media support surface 75. In the example embodiment illustrated, actuator arm 130 is pivotally mounted on a pick arm shaft 53 of pick mechanism 52 and flag arm 120 is pivotably mounted on guide member 70. The state of sensor 110 is generally influenced by the movement of flag mechanism 105. In particular, actuator arm 130 and flag arm 120 are operatively coupled to each other such that flag arm 120 changes the state of sensor 110 when actuator arm 130 moves in response to the presence or absence of media in media support surface 75, as discussed in further detail below. In addition, pick arm shaft 53 is connected to front panel 35 such that closing and opening front panel 35 pivots pick arm shaft 53 together with front panel 35 allowing for flag mechanism 105 to be retracted and disposed within MPF 30 as front panel 35 is closed, also discussed further detail below.

Figure 4:
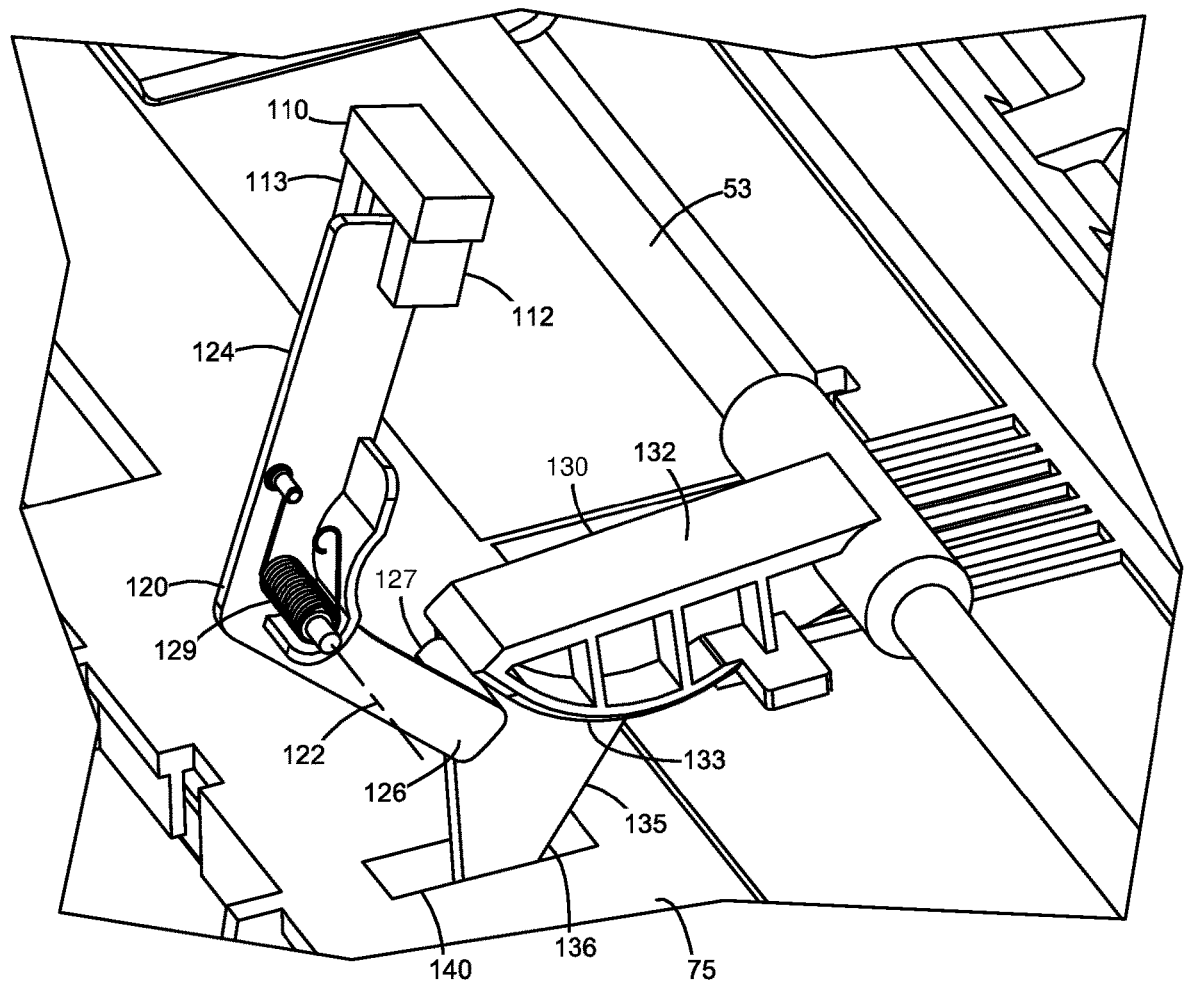
FIG. 4 is a perspective view of a media presence sensing assembly in the manual input feeder with no media therein according to one example embodiment.
Figure 5:
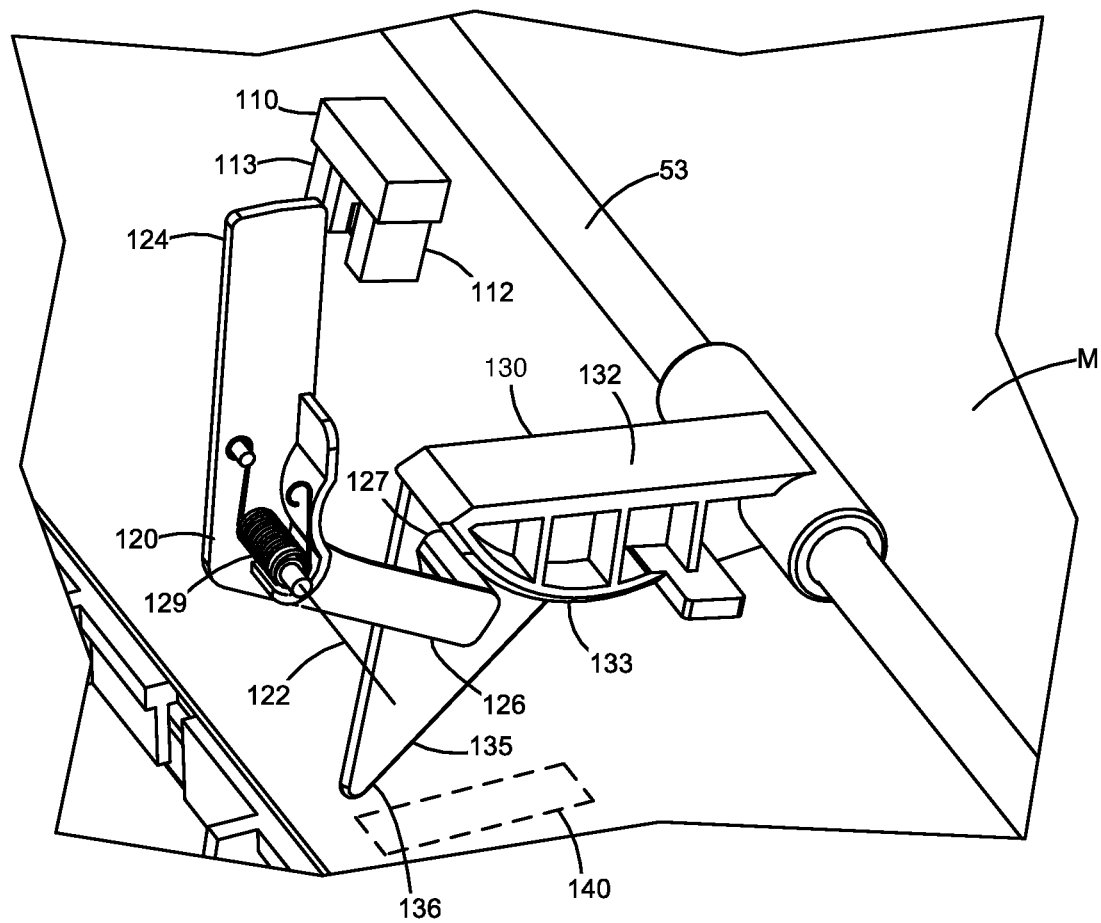
FIG. 5 is a perspective view of the media presence sensing assembly with media disposed in the manual input feeder according to one example embodiment.

With reference to FIGS. 4-5, media presence sensing assembly 100 is shown in more detail. It is noted that pick mechanism 52 has been removed in FIGS. 4-5 to better illustrate media presence sensing assembly 100. Sensor 110 is shown as an optical sensor including an optical emitter 112 positioned to emit optical energy toward a receiver 113. Receiver 113 is configured to detect the presence or absence of the optical energy. Emitter 112 and receiver 113 are separated from each other by a gap through which the optical path of sensor 110 passes. The state of sensor 110 changes when the optical path is blocked and unblocked by flag arm 120.

Flag arm 120 is pivotably mounted to guide member 70 for pivotal movement about a pivot axis 122. Flag arm 120 has a first end 124 extending towards sensor 110 and a second end 126 extending towards actuator arm 130. First end 124 of flag arm 120 moves between emitter 112 and receiver 113 into or out of the optical path therebetween as flag arm 120 pivots about pivot axis 122. Second end 126 of flag arm 120 has a follower arm 127 that contacts a portion of actuator arm 130. A torsion spring 129 biases flag arm 120 to rotate in a direction that moves follower arm 127 towards and in contact with actuator arm 130. In this example, opposite ends of torsion spring 129 are connected to flag arm 120 and guide member 70, respectively, so as to continuously urge follower arm 127 of flag arm 120 to remain in contact with actuator arm 130.

Actuator arm 130 is rotatable around an axis of rotation of pick arm shaft 53 independent of pick arm shaft 53 and is free to fall by gravity towards media support surface 75. Actuator arm 130 includes a base 132 rotatably mounted on pick arm shaft 53 and an engagement arm 135 depending at an angle from base 132. Engagement arm 135 extends at a length from base 132 such that actuator arm 130 is engageable and movable by a media sheet disposed in media support surface 75. Base 132 includes a curved cam surface 133 that is in contact with follower arm 127 of flag arm 120. When actuator arm 130 rotates about pick arm shaft 53, follower arm 127 of flag arm 120 remains in contact with cam surface 133 due to the biasing force of torsion spring 129 such that follower arm 127 slides along cam surface 133 causing flag arm 120 to also rotate. The operative connection between cam surface 133 and follower arm 127 allows flag arm 120 to rotate and change the state of sensor 110 when actuator arm 130 rotates.

In operation, while front panel 35 is opened to provide access to MPF 30, flag mechanism 105 is movable between a first position when there is no media in media support surface 75 as illustrated in FIG. 4 and a second position when media is present in media support surface 75 as illustrated in FIG. 5. Consequently, the movement of flag mechanism 105 between the first position and the second position changes the state of sensor 110 in communication with controller 55 signaling to controller 55 that media is either absent or present in media support surface 75, respectively.

More particularly, when media support surface 75 is empty as illustrated in FIG. 4, a free end 136 of engagement arm 135 travels below the top of media support surface 75 through an aperture 140. Aperture 140 in media support surface 75 allows actuator arm 130 to rotate downward through an amount of angular displacement that causes flag arm 120 to rotate in a direction that moves its first end 124 to block the optical path of sensor 110. In the example embodiment illustrated in FIG. 4, follower arm 127 moves toward a distal end of cam surface 133 as free end 136 of engagement arm 135 falls within aperture 140 causing first end 124 of flag arm 120 to rotate and block the optical path of sensor 110. Accordingly, when flag mechanism 105 is in the first position as shown in FIG. 4, the optical path of sensor 110 is blocked indicating the absence of media in media support surface 75 of MPF 30.

When a media sheet M is placed in media support surface 75 as illustrated in FIG. 5, actuator arm 130 sits on top of media sheet M. Media sheet M is placed in media support surface 75 by inserting the media sheet M in a direction towards media dam 68 which lifts the free end 136 of engagement arm 135 out of aperture 140 causing actuator arm 130 to rotate away from media support surface 75. Rotation of actuator arm 130 causes follower arm 127 to move along cam surface 133 from the distal end toward a central portion thereof causing flag arm 120 to rotate in a direction that moves its first end 124 to unblock the optical path of sensor 110. Accordingly, when flag mechanism 105 is in the second position as shown in FIG. 5, the optical path of sensor 110 is unblocked indicating the presence of media in media support surface 75.

As will be appreciated, reverse logic to that described may also be used. For example, the sensor may be arranged in such a manner that blocking the optical path indicates the presence of media and unblocking the optical path indicates the absence of media. Additionally, in other alternative embodiments, other types of sensors may be used.

FIGS. 6A-6D are sequential side-sectional views illustrating various positions of media presence sensing assembly 100 as media input tray 24 moves relative to option assembly housing 22 and MPF 30 is accessed. It is noted that pick mechanism 52 has been omitted in FIGS. 6A-6D to better illustrate the operation of media presence sensing assembly 100.

Figure 6A:
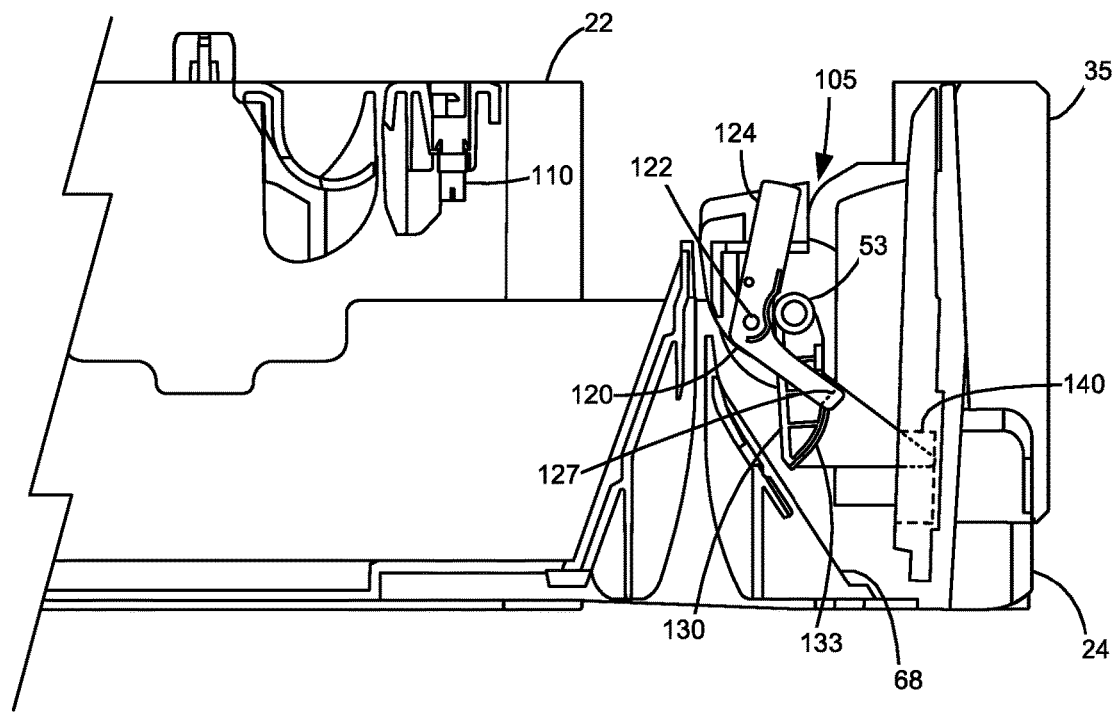
FIGS. 6A-6C are sequential side-sectional views illustrating various positions of media presence sensing assembly in FIGS. 4 and 5.

In FIG. 6A, media input tray 24 is partially opened with front panel 35 in the closed position. Closing front panel 35 moves pick arm shaft 53 towards the pivot axis 122 of flag arm 120. Actuator arm 130 rotates downward under its own weight toward the lower vertical position which causes follower arm 127 of flag arm 120 to move along cam surface 133 of actuator arm 130 and be positioned at about the apex of cam surface 133. In this position, flag mechanism 105 fits within a space between media dam 68 and front panel 35. While media input tray 24 is opened, flag mechanism 105 disposed in media input tray 24 is separated from sensor 110 disposed in option assembly housing 22.

Figure 6B:
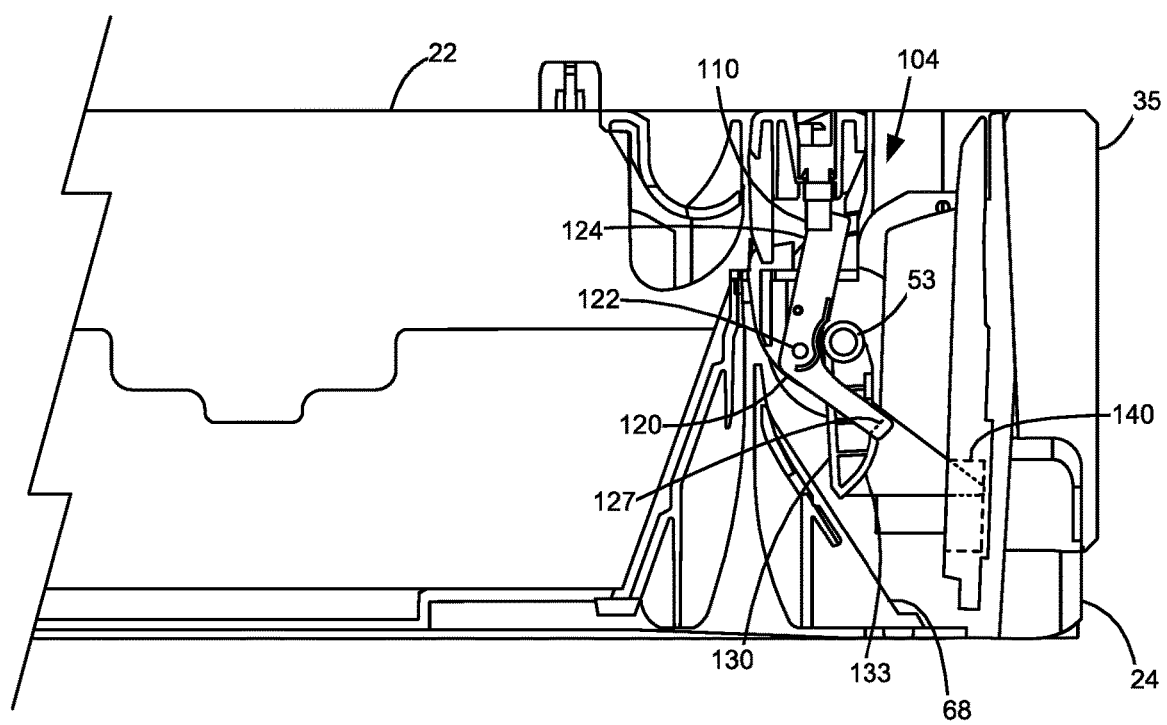

In FIG. 6B, media input tray 24 is inserted into housing 22 moving flag mechanism 105 into an operative position relative to sensor 110. In the operative position, flag mechanism 105 may change the state of sensor 110 when flag mechanism 105 moves. In the example embodiment illustrated in FIG. 6B, first end 124 of flag arm 120 is positioned along the optical path of sensor 110 when media input tray 24 is fully inserted into housing 22 with front panel 35 closed.

Figure 6C:
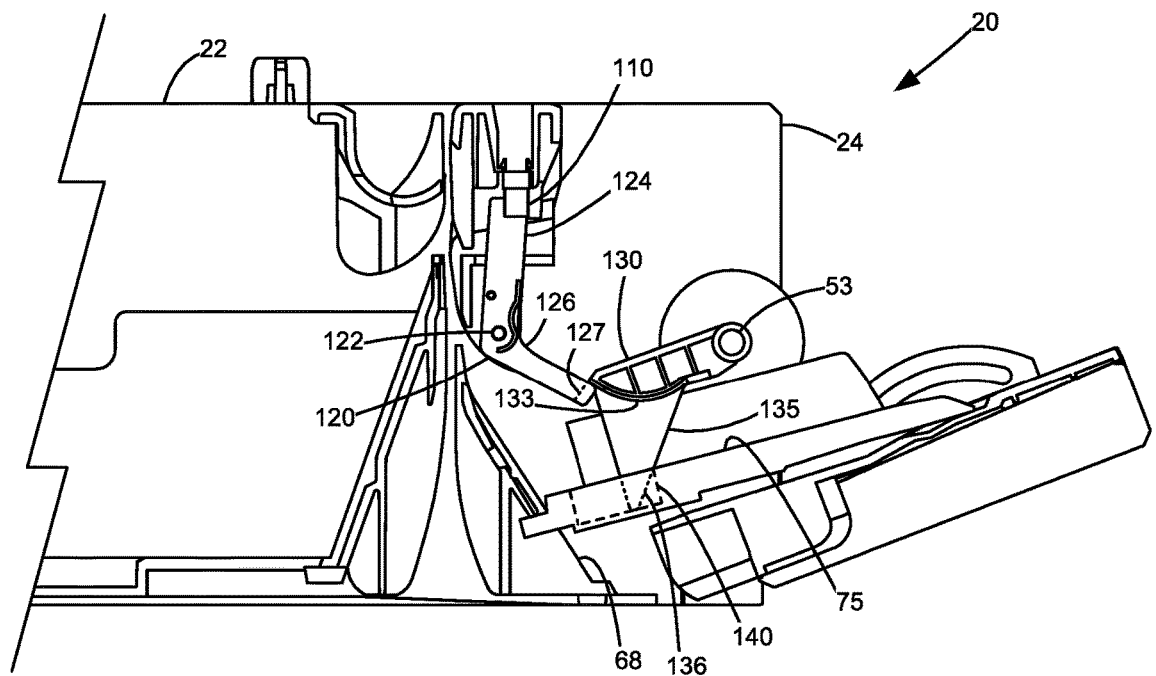

When front panel 35 is opened as illustrated in FIG. 6C, pick arm shaft 53 pivots together with front panel 35 and is separated from the pivot axis 122 of flag arm 120. Actuator arm 130 falls by gravity toward media support surface 75 and engagement arm 135 passes through aperture 140. Since follower arm 127 of flag arm 120 is continuously biased by torsion spring 129 against cam surface 133 of actuator arm 130, follower arm 127 slides along cam surface 133 as actuator arm 130 rotates and is positioned at the distal end of cam surface 133 when actuator arm 130 reaches its downward rotational stop. In this example, movement of follower arm 127 from the apex to the distal end of cam surface 133 as front panel 35 is opened causes flag arm 120 to slightly rotate, but first end 124 of flag arm 120 remains positioned between emitter 112 and receiver 113 blocking the optical path of sensor 110. Accordingly, the state of sensor 110 does not change as front panel 35 moves from the closed position to the open position.

Figure 6D:
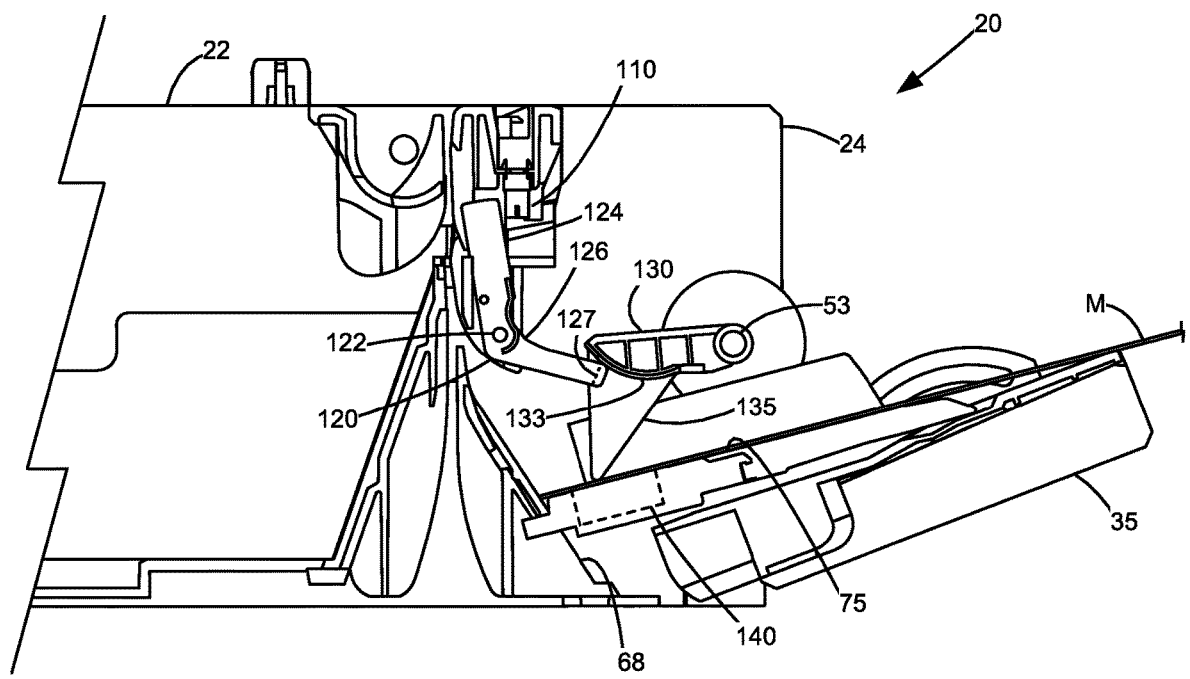
FIG. 6D is a side-sectional view with a media sheet disposed in the media support surface causing rotation of the actuator arm.

In FIG. 6D, media sheet M has been disposed in media support surface 75. During insertion of media sheet M, the leading edge of media sheet M contacts and pushes engagement arm 135 in a direction towards media dam 68 lifting the free end 136 of engagement arm 135 out of aperture 140 and causing actuator arm 130 to rotate. As actuator arm 130 rotates, follower arm 127 slides along cam surface 133 in a direction toward the central portion thereof causing flag arm 120 to rotate counter-clockwise, as viewed in FIG. 6D, and first end 124 of flag arm 120 to unblock the optical path of sensor 110. Accordingly, the state of sensor 110 changes from a blocked state to an unblocked state indicating that media has been placed in media support surface 75.

Subsequently, in the event of media removal or exhaustion, actuator arm 130 falls under its own weight until free end 136 of engagement arm 135 travels below aperture 140 in media support surface 75 causing first end 124 of flag arm 120 to rotate and block the optical path of sensor 110 as illustrated in FIG. 6C. Accordingly, the state of sensor 110 changes from the unblocked state to the blocked state indicating the absence of media in media support surface.

With the above example embodiments, a two-flag mechanism for media presence detection in a manual input feeder is used. This allows for the flag mechanism used to actuate the sensor to fit and hide within the MPF when the front panel is closed. In particular, when MPF 30 is closed, both flag arm 120 and actuator arm 130 of the flag mechanism 105 can rotate about their respective axes of rotation and can be positioned within the space between media dam 68 and the closed front panel 35. When the MPF 30 is opened, the flag mechanism 105 may be positioned such that the actuator arm can sit on media and the flag arm can reach the sensor for actuation. In addition, the above example embodiments introduce notions of having an MPF with the sensor and flag mechanism in separate assemblies. Specifically, the sensor is fixedly positioned in the option unit housing while the flag mechanism is mounted on the removable media input tray. By having the sensor mounted in the option unit housing and not in the removable media tray, the sensor does not have to break off electrical connection with the controller when the media input tray is removed from the option unit housing. In this way, no electrical contacts between the MPF and the option unit housing is required to establish connection and disconnection between sensor and the controller in the imaging device when the media input tray is inserted into and removed from the imaging device, respectively.

The descriptions of the details of the example embodiments have been described using the multi-purpose feeder incorporated in the media input tray of an option assembly. However, it will be appreciated that the teachings and concepts provided herein are applicable to any removable media tray, such as removable media tray 14 integrated into the lower portion of housing 12 of imaging apparatus 10. In this example, the sensor is mounted on the housing of the imaging apparatus while the flag mechanism is mounted on the media tray and interfaces with the sensor when the media tray is inserted into the housing of the imaging apparatus.

The foregoing description illustrates various aspects and examples of the present disclosure. It is not intended to be exhaustive. Rather, it is chosen to illustrate the principles of the present disclosure and its practical application to enable one of ordinary skill in the art to utilize the present disclosure, including its various modifications that naturally follow. All modifications and variations are contemplated within the scope of the present disclosure as determined by the appended claims. Relatively apparent modifications include combining one or more features of various embodiments with features of other embodiments.

What is claimed:

1. A removable media input tray for an image forming device, comprising:
    a manual input feeder having a fold-out tray that is foldable out of a front of the media input tray for holding at least one media sheet;
    a first arm pivotably mounted on the manual input feeder and movable between a first position when no media sheet is present in the fold-out tray and a second position when the at least one media sheet is disposed in the fold-out tray; and
    a second arm pivotably mounted about a second pivot axis above the fold-out tray, the second arm is operatively connected to the first arm such that the second arm changes a state of a sensor in the image forming device when the first arm moves between the first position and the second position, wherein when the media input tray is removed from the image forming device, the first and second arms are separated from the sensor such that movement of the first and second arms does not change the state of the sensor.

* * * * *